(12) United States Patent
Kwak et al.

(10) Patent No.: US 6,411,600 B1
(45) Date of Patent: Jun. 25, 2002

(54) ASYNCHRONOUS TRANSFER MODE (ATM) PROTECTION TRIGGERING METHOD USING "RECEIVE-AIS (ALARM INDICATION SIGNAL)" FLAG

(75) Inventors: Dong Yong Kwak; Yool Kwon, both of Daejeon (KR)

(73) Assignees: Electronics and Telecommunications Research Institute, Daejeon (KR); Korea Telecom, Seoul (KR)

( * ) Notice: Subject to any disclaimer, the term of this patent is extended or adjusted under 35 U.S.C. 154(b) by 0 days.

(21) Appl. No.: 09/129,923

(22) Filed: Aug. 6, 1998

(30) Foreign Application Priority Data

Dec. 3, 1997 (KR) .............................................. 97-65707

(51) Int. Cl.[7] .............................................. H04L 12/24
(52) U.S. Cl. ....................... 370/225; 370/244; 370/396; 370/410
(58) Field of Search ................................ 370/216, 225, 370/226, 227, 228, 217, 218, 235, 236, 237, 242, 243, 244, 248, 250, 252, 395, 396, 410, 401

(56) References Cited

U.S. PATENT DOCUMENTS

| | | | |
|---|---|---|---|
| 5,239,537 A | | 8/1993 | Sakauchi ........................ 370/16 |
| 5,343,402 A | | 8/1994 | Sekibata et al. ............... 370/13 |
| 5,461,607 A | * | 10/1995 | Miyagi et al. ............... 370/244 |
| 5,631,896 A | | 5/1997 | Kawase et al. .............. 370/228 |
| 5,790,531 A | * | 8/1998 | Ellebracht et al. .......... 370/242 |
| 5,943,314 A | * | 8/1999 | Croslin ........................ 370/216 |
| 6,049,523 A | * | 4/2000 | Anderson et al. ........... 370/217 |
| 6,130,876 A | * | 10/2000 | Chaudhuri et al. ......... 370/228 |
| 6,198,726 B1 | * | 3/2001 | Hayami et al. ............. 370/236 |
| 6,247,051 B1 | * | 6/2001 | Shimada ..................... 709/224 |

OTHER PUBLICATIONS

Saloua Ben Yahia and Chantal Robach, Self–Healing Mechanisms in ATM Networks: The Role of Virtual Path Management Functions, IEEE 1997, pp. 1719–1723.

Ryutaro Kawamura, Ken–ichi sato, Ikuo Tokizawa, "Self–Healing ATM Networks Based on Virtual Path Concept", IEEE Journal on Selected Areas in Communications, vol. 12, No. 1, 1994, pp. 120–127.

\* cited by examiner

*Primary Examiner*—Huy D. Vu
(74) *Attorney, Agent, or Firm*—Cohen, Pontani, Lieberman & Pavane (57) ABSTRACT

An asynchronous transfer mode (ATM) protection triggering method using "received-AIS" flag determines whether the failure generation position is generated within a protected domain or not, by determining whether the "received-AIS" flag is "0" in case that a node detecting a failure link transmits an end-to-end AIS cell to a downstream side node, and a source point passing the end-to-end AIS cell sets the "received-AIS" flag to "1" and then receives "AIS cell receiving" signal from a sink point of the protected domain, thereby obviating a CRC-10 calculation problem and a backward compatibility.

5 Claims, 9 Drawing Sheets

ASYNCHRONOUS TRANSFER MODE (ATM) PROTECTION TRIGGERING METHOD USING "RECEIVE-AIS (ALARM INDICATION SIGNAL)" FLAG

BACKGROUND OF THE INVENTION

1. Field of the Invention

The present invention relates generally to an asynchronous transfer mode (hereinafter referred to as ATM) protection triggering method for determining a failure generation location in an ATM network wherein the protected domains are sequentially set or nested. More particularly, it relates to an ATM protection triggering method using "received-AIS (alarm indication signal)" flag, which determines whether the failure is generated within the protected domain or not.

2. Description of the Related Art

An ATM protection triggering method belongs to an ATM protection switch field. A standardization regarding this ATM protection triggering method has been progressed in the ITU-T SG13. A protection switch function can be set by each ATM interface unit. Any protected domain may include another protected domain, and may have a nested structure included in other protected domain. The protected domain can be extended to an entire area between the originating user and the answering user, or can be set in one portion among the entire area. The reason why the protected domain is established is to prepare a spare link for replacing a defective link when a failure occurs in a link within a protected domain therein, thereby enhancing a restoration ability and a reliability of the ATM network. The greatest problem among the present protection switch functions is a method for determining whether a failure is generated within the protected domain or not.

Conventionally, in order to determine whether the failure generation position is present in the protected domain or is out of the protected domain in a nested structure of the protected domain, a new field should be added to an end-to-end alarm indication signal (AIS) cell.

However, the method for adding new field to the end-to-end AIS cell requires a modification of the end-to-end AIS cell at both a source point and a sink point of the protected domain. Accordingly, a shortcoming that CRC(Cyclic Redundancy Check)-10 should be calculated in a real-time, and a backward compatibility that an original end-to-end operation and maintenance (OAM) cell should be changed are generated in the conventional method.

SUMMARY OF THE INVENTION

The present invention is directed to an ATM protection triggering method using "received-AIS" flag which substantially obviates the above-described problem due to limitations and disadvantages of the related art.

It is an object of the present invention to provide an ATM protection triggering method using "received-AIS" flag, which determines whether the failure is generated within a protected domain or not.

It is another object of the present invention to provide an ATM protection triggering method using "received-AIS" flag, which determines whether a failure is generated within a protected domain or not, by determining whether the "received-AIS" flag is "0" in case that a node detecting a failure link transmits an end-to-end AIS cell to a downstream side node, and a source point passing the end-to-end AIS cell sets the "received-AIS" flag to "1" and then receives "AIS cell receiving" signal from a sink point of the protected domain, thereby obviating a CRC-10 calculation problem and a backward compatibility.

In order to realize the above objectives, in an asynchronous transfer mode (ATM) protection triggering method for determining a failure generation position in an ATM network wherein protected domains are sequentially set or nested, the ATM protection triggering method using "received-AIS" flag includes:

a first step in which "received AIS" flag of a source point of the protected domain is initialized as "0" at every protected domain;

a second step in which a node detecting a failure generates an end-to-end AIS cell to a downstream side node;

a third step in which a source point of a protected domain passing the end-to-end AIS cell of the second step performs "received-AIS" flag processing;

a fourth step in which a sink point of the protected domain receiving the end-to-end AIS cell of the second step performs the end-to-end AIS cell processing, and send an AIS cell receiving report to the source point of the protected domain; and a fifth step in which the source point of the protected domain receives the AIS cell receiving report of the fourth step, and then a protection switch is operated.

Additional features and advantages of the invention will be set forth in the description which follows, and in part will be apparent from the description, or may be learned by practice of the invention. The objective and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Reference will now be made in detail to the preferred embodiment of the present invention, examples of which are illustrated in the accompanying drawings.

Figure 1:
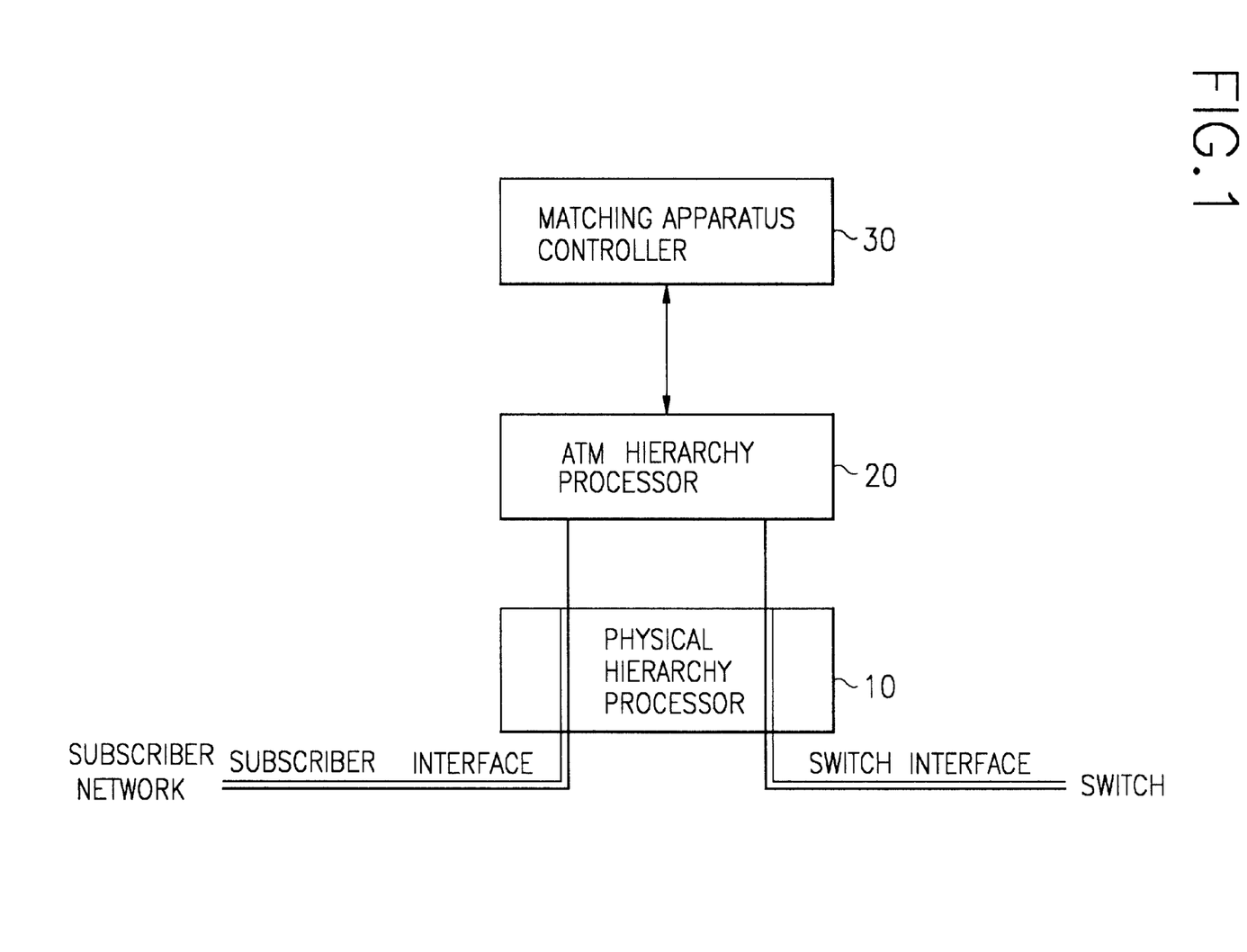
FIG. 1 is a block diagram of a matching apparatus applied to the present invention.

FIG. 1 is a block diagram of a matching apparatus applied to the present invention. The matching apparatus includes:

a physical hierarchy processor 10 which selects an ATM cell from a synchronous transport module (STM)-1 frame, transmits the ATM cell to an ATM hierarchy processor 20, loads the ATM cell from the ATM hierarchy processor 20 on the STM-1 frame, and transmits the ATM cell to a subscriber;

an ATM hierarchy processor 20 which attaches both a virtual path identifier (hereinafter referred to as VPI) conversion information needed to a routing and a tag loading an internal routing information to the ATM cell received from the physical hierarchy processor 10, transmits them to a switch network, transmits a received cell from the switch network to the physical hierarchy processor 10, monitors a user cell received from the subscriber, receives an operation and maintenance (OAM) cell, and then transmits the OAM cell to a matching apparatus controller 30; and a matching apparatus controller 30 which initializes both a register and a memory used in the physical hierarchy processor 10 and the ATM hierarchy processor 20, and controls a triggering cell received from the ATM hierarchy processor 20.

The aforementioned matching apparatus will be operated as follows.

In case of a signal receiving, if the physical hierarchy processor 10 selects an ATM cell from STM-1 frame transmitted through a subscriber network and transmits the ATM cell to the ATM hierarchy processor 20, the ATM hierarchy processor 20 monitors a user cell received from the subscriber, attaches both a VPI conversion information needed to a routing and a tag loading an internal routing information to the ATM cell, and transmits them to a switch network.

In case of a signal transmission, the ATM hierarchy processor 20 transmits the ATM cell received from the switch network to the physical hierarchy processor 10, and transmits an OAM cell to the matching apparatus controller 30. The physical hierarchy processor 10 loads the ATM cell received from the ATM hierarchy processor 20 on the ATM-1 frame, and transmits the ATM cell to the subscriber.

Herein, the matching apparatus controller 30 initializes both a register and a memory used in the physical hierarchy processor 10 and the ATM hierarchy processor 20, and controls a triggering cell received from the ATM hierarchy processor 20.

Figure 2:
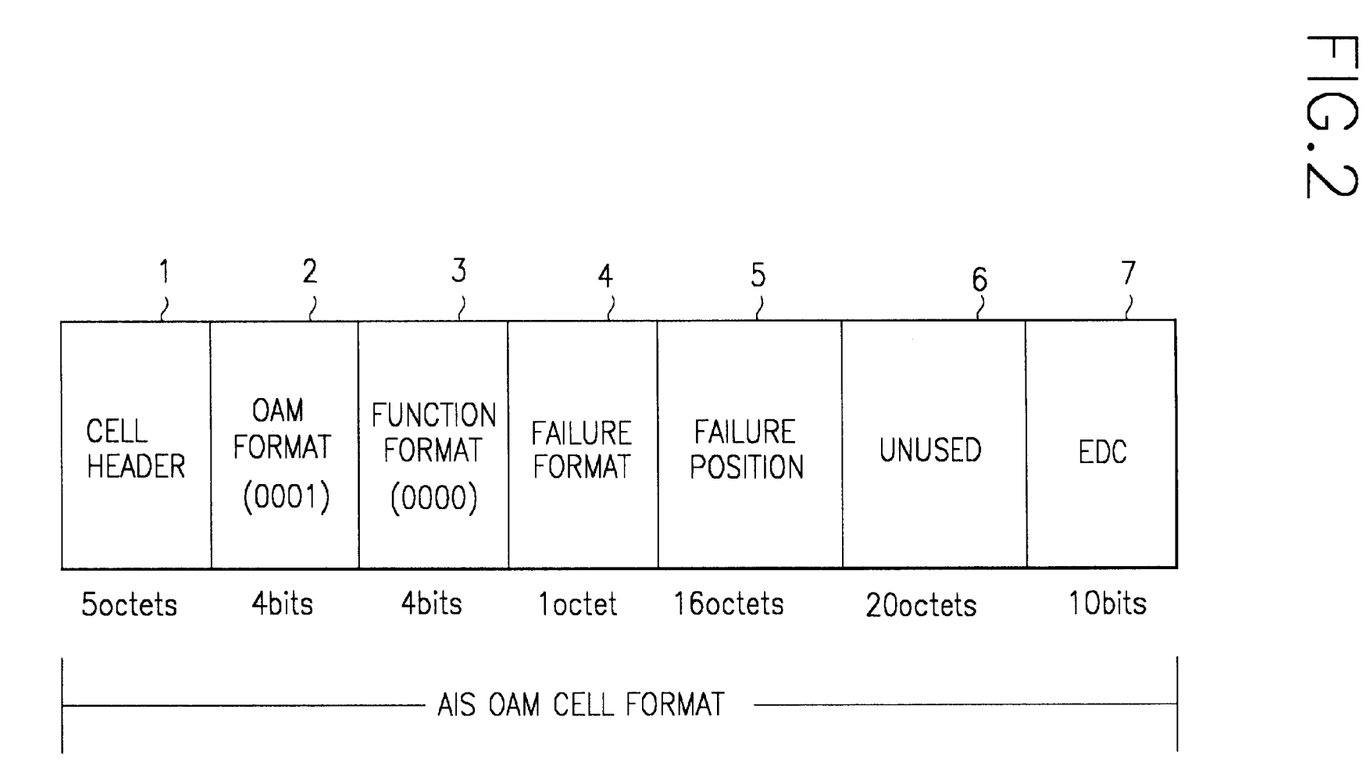
FIG. 2 is an AIS cell format applied to the present invention.

FIG. 2 is an AIS OAM cell format applied to the present invention.

An AIS OAM cell shown in FIG. 2 is defined in ITU-T I.610, and is comprised of 53 bytes. The AIS OAM cell includes:

a cell header 1 of 5 octects for indicating a data Information;

an OAM format field 2 of 4 bits being expressed as "0001" for indicating an AIS OAM cell;

a function format field 3 of 4 bits being expressed as "0000" for indicating an AIS OAM cell;

a failure format field 4 of 1 octect which determines whether an OAM cell belongs to a failure management or to a performance monitoring, and indicates that the OAM cell belong to which one in three cell formats (i.e., AIS, RDI, and a performance monitoring) of the failure management;

a failure position field 5 of 16 octects for indicating an address of a node detecting a failure or an address of a node wherein a failure is generated;

an unused field 6 of 20 octects being leaved to be used in the future; and an error detection code (hereinafter referred to as EDC) 7 of 10 bits which stores a result of CRC-10 performed about all remaining fields except for both the cell header 1 and a DEC field.

If a serious failure occurs in a link, the aforementioned ATM OAM cell is periodically generated from a node first detecting the failure at predetermined intervals of, for example, every 1 second.

Figure 3:
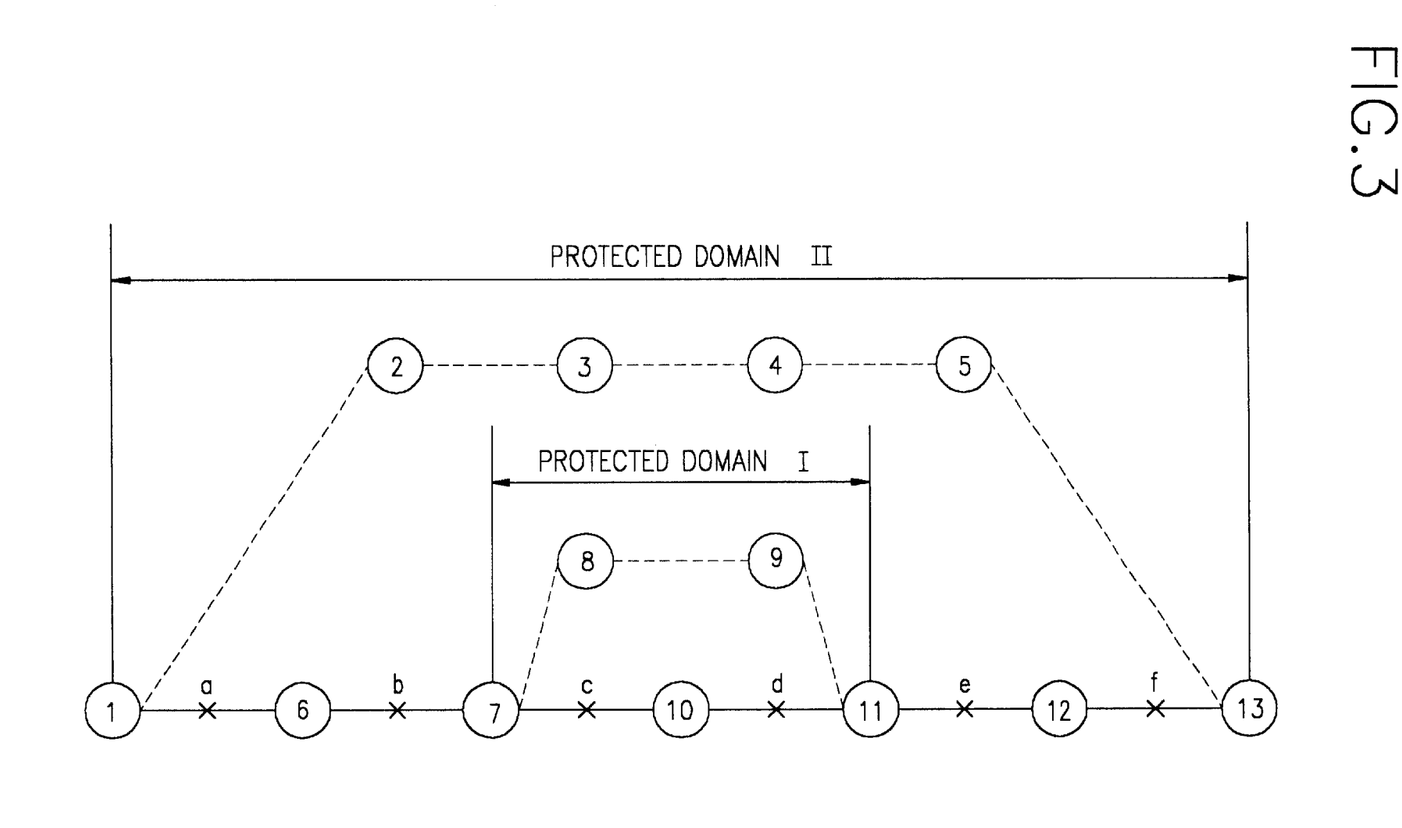
FIG. 3 is a diagram showing a protected domain of an ATM network applied to the present invention.

FIG. 3 is a diagram showing a protected domain of an ATM network applied to the present invention, and shows that two protected domains are nested in one link. In FIG. 3, each of circles indicates a switch node, a plurality of reference numerals 1–13 indicate each of addresses of the switch nodes, parentheses indicate a protected domain identification address inserted into the failure position field of the AIS cell, and characters a–f indicate a position at which a failure is generated.

A working entity of a protected domain II ranges from a node 1 to a node 13, namely, is formed by nodes of 1-6-7-10-11-12-13. A protection entity which is set to replace a failure entity when a failure occurs in the working entity, ranges from the node 1 to the node 13, namely, is formed by nodes of 1-2-3-4-5-13.

A working entity of a protected domain I is formed by nodes of 7-10-11. A protection entity which is set to replace a failure entity when a failure occurs in the working entity, ranges from the node 7 to the node 11, namely, is formed by nodes of 7-8-9-11.

When the information is transmitted from the node 1 to the node 13, the node 1 is called a source point and the node 13 is called a sink point of the protected domain II. Also, the node 7 is called a source point and the node 11 is called a sink point of the protected domain I. Accordingly, if there are failures in the point of a or b, "received-AIS" flag of a source point (i.e., node 7) of the protected domain I is changed to "1". This means that a failure is generated outside of the protected domain I.

If there are failures in the point of c or d, a "received-AIS" flag of a source point of the protected domain I is unchanged to "0". This means that a failure is generated inside of the protected domain I.

As described above, if there is a failure in either the protected domain I or the protected domain II, the data transmitted through a working entity is converted to a protection entity by using a protection switch operation in response to an ATM protection triggering method.

Figure 4:
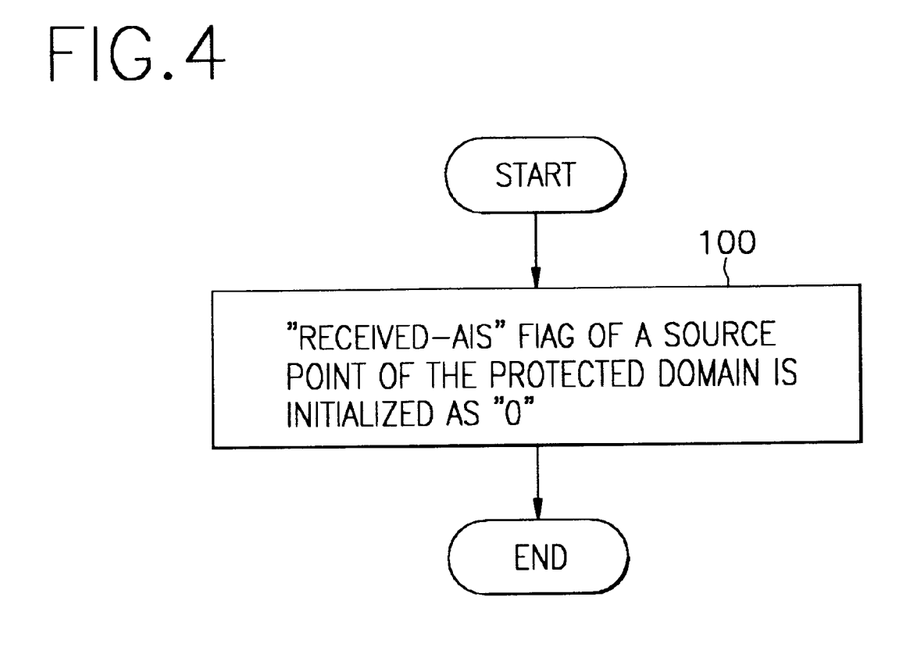
FIG. 4 is a flow chart illustrating an initialization of a source point of the protected domain in accordance with the present invention.

FIG. 4 is a flow chart illustrating an initialization of a source point of the protected domain in accordance with the present invention. At step S100 of FIG. 4, "received-AIS" flag of a source point of the protected domain is initialized as "0" at every the protected domain.

Figure 5:
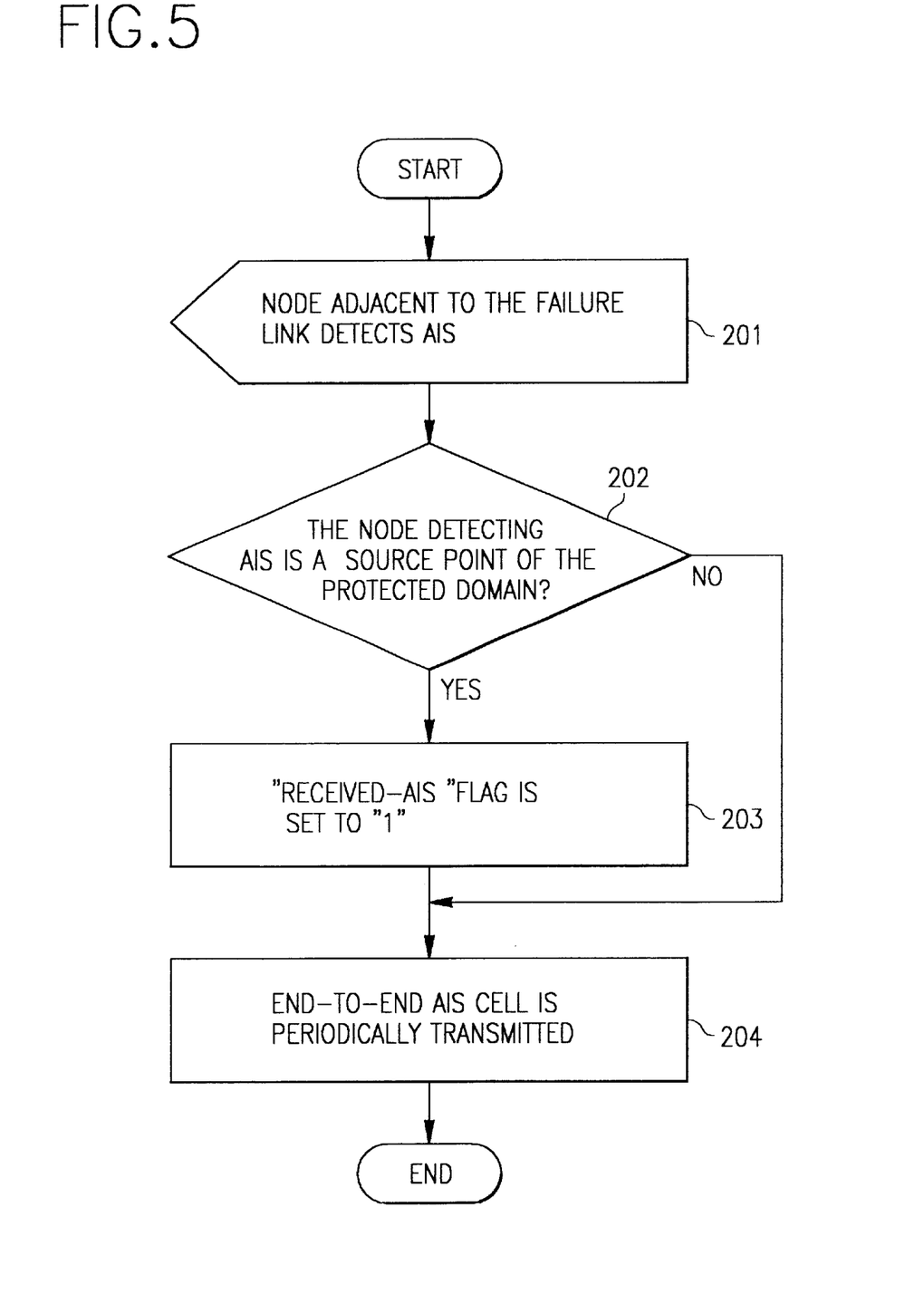
FIG. 5 is a flow chart illustrating a processing performed at a node detecting a failure in accordance with the present invention.

FIG. 5 is a flow chart illustrating a processing performed at a node detecting a failure in accordance with the present invention.

If an alarm signal is generated in a link having a failure therein, a node adjacent to the failure link detects a defect (at step S201). It is determined that the node detecting the defect in the step S201 is a source point of a protected domain or not (at step S202). If it is determined that the node is the source point in the step S202, the "received-AIS" flag is set to "1" (at step S203), and the node periodically transmits an end-to-end AIS cell to a downstream side node (at step S204).

On the contrary, if it is determined that the node is not the source point in the step S202, the "received-AIS" flag is not set to "1", and the node periodically transmits the end-to-end AIS cell to a downstream side node (at step S204).

Figure 6:
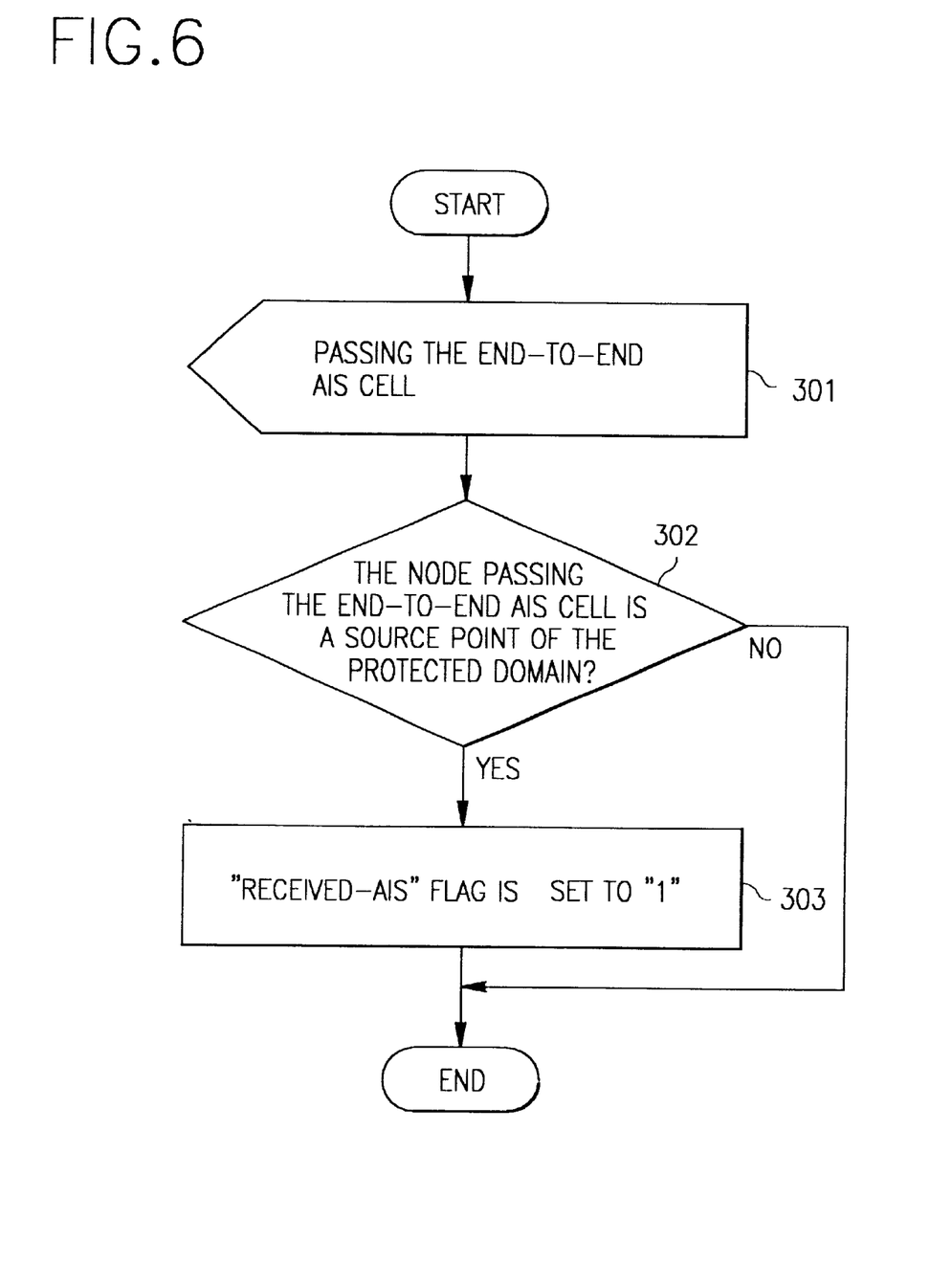
FIG. 6 is a flow chart illustrating a processing performed when a source point of a protected domain receives an end-to-end AIS cell in accordance with the present invention.

FIG. 6 is a flow chart illustrating a processing performed when a source point of a protected domain receives an end-to-end AIS cell in accordance with the present invention.

If an end-to-end AIS cell generated in the downstream side node (i.e., the node detecting the AIS) passes through a node of the protected domain (at step S301), it is determined that the node of the protected domain is a source point or not (at step S302). If the node is the source point in the step S302, "received-AIS" flag is set to "1" (at step S303). If the node is not the source point in the step S302, a program of FIG. 6 is terminated.

Figure 7:
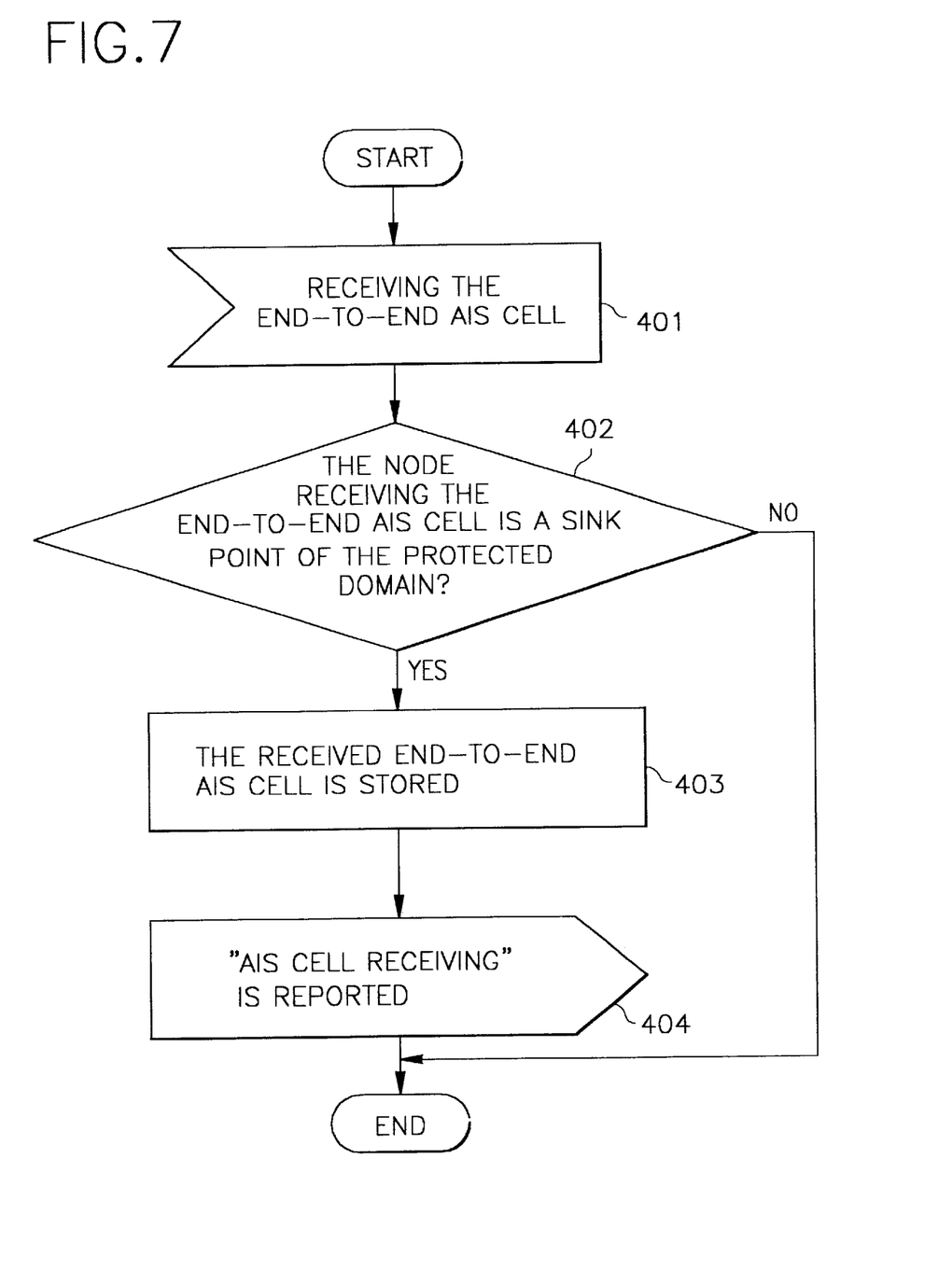
FIG. 7 is a flow chart illustrating a processing performed when a sink point of a protected domain receives an end-to-end AIS cell in accordance with the present invention.

FIG. 7 is a flow chart illustrating a processing performed when a sink point of a protected domain receives an end-to-end AIS cell in accordance with the present invention.

A node of a protected domain receives an end-to-end AIS cell generated in an upstream side node (at step S401). It is determined that a node receiving the end-to-end AIS cell is a sink point of a protected domain or not (at step S402). If the node is the sink point of the protected domain in the step S402, the received end-to-end AIS cell is stored (at step S403), and transmits a "AIS cell receiving" signal to the source point of the protected domain via a protection entity (at step S404). On the contrary, if the node is not the sink point in the step S402, a operation of FIG. 7 is terminated.

Figure 8:
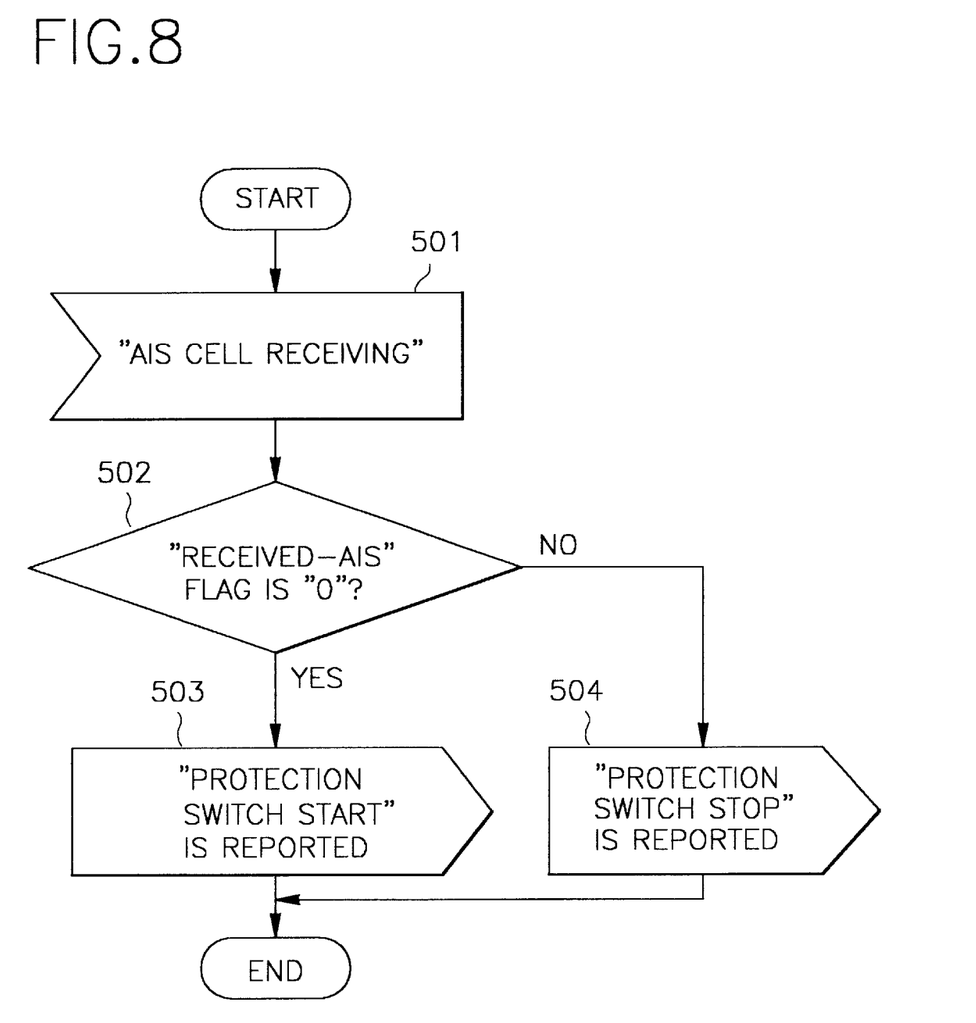
FIG. 8 is a flow chart illustrating a processing performed when a source point of a protected domain receives a message of "AIS cell receiving" in accordance with the present invention.

FIG. 8 is a flow chart illustrating a processing performed when a source point of a protected domain receives a message of "AIS cell receiving" in accordance with the present invention.

A source point of the protected domain receives a signal of "AIS cell receiving" from a sink point of the protected domain via a protection entity (at step S501), and then determines whether the "received-AIS" flag is "0" or not (at step S502). If the "receiving-AIS" flag is "0", the source point transmits a signal of "protection switch start" to a sink point of the protected domain through the protection entity (at step S503). If the "receiving-AIS" flag is not "0" in the step S502, the source point transmits a signal of "protection switch stop" to the sink point of the protected domain through the protection entity (at step S504).

Figure 9:
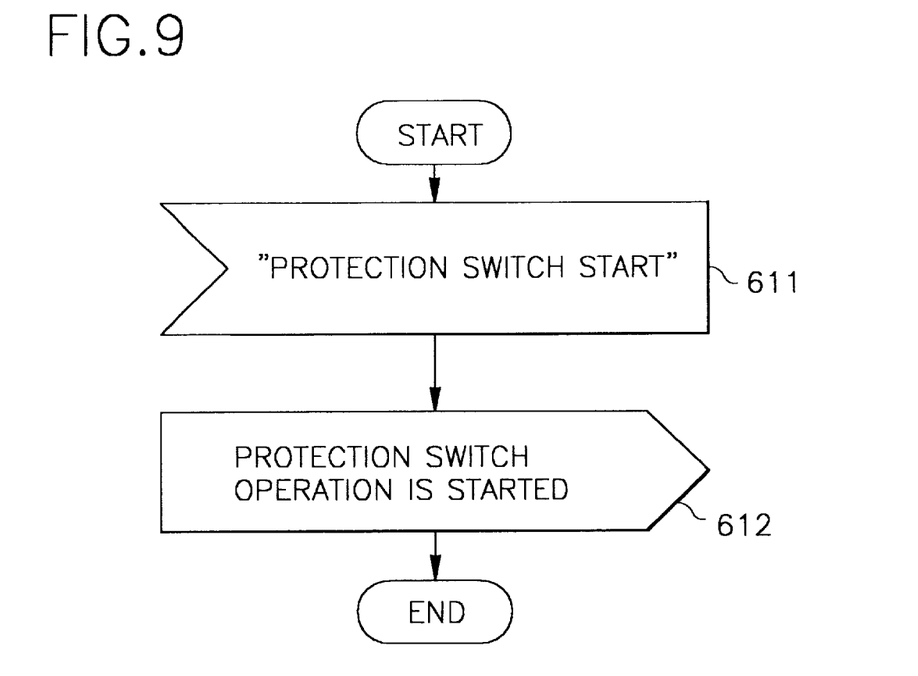
FIG. 9 is a flow chart illustrating a processing performed when a sink point of a protected domain receives a message of "protection switch start" in accordance with the present invention.

FIG. 9 is a flow chart illustrating a processing performed when a sink point of a protected domain receives a message of "protection switch start" in accordance with the present invention.

A sink point of a protected domain receives a signal of "protection switch start" from the source point of the protected domain through a protection entity (at step S611), and starts a switch operation (at step S612).

Figure 10:
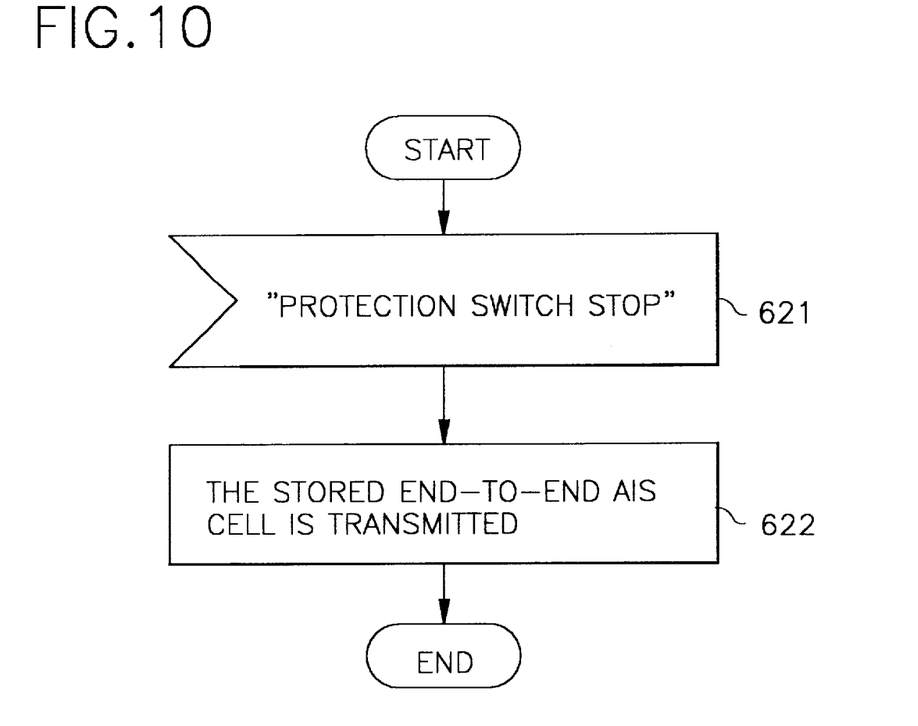
FIG. 10 is a flow chart illustrating a processing performed when a sink point of a protected domain receives a message of "protection switch stop" in accordance with the present invention.

FIG. 10 is a flow chart illustrating a processing performed when a sink point of a protected domain receives a message of "protection switch stop" in accordance with the present invention.

A sink point of a protected domain receives a signal of "protection switch stop" from the source point of the protected domain through a protection entity (at step S621), and transmits a stored end-to-end AIS cell to a downstream side node (at step S622).

As described above, an ATM protection triggering method according to the present invention determines whether the failure is generated within a protected domain or not. Accordingly, the ATM protection triggering method does not require a real-time CRC-10 calculation caused by that an end-to-end AIS cell is changed at the source point and the sink point of the protected domain, and improves a backward compatibility that an original end-to-end OAM cell should be changed.

According to the ATM protection triggering method using "received-AIS" flag, in case that an AIS flag of a source point of each protected domain is initialized, and a node detecting a failure transmits an end-to-end AIS cell to downstream side nodes, all nodes respectively indicated as a source point of the protected domain, among the downstream side nodes, sets "received-AIS" flag to "1" when passing the end-to-end AIS cell generated in the upstream side node.

All nodes respectively indicated as a sink point of the protected domain, among the downstream side nodes, receives the end-to-end AIS cell generated in the upstream side nodes, stores the end-to-end AIS cell, and transmits "AIS cell receiving" signal to a source point of the protected domain through a protection entity. The source point receiving a signal of "AIS cell receiving" determines whether the "AIS cell receiving" signal is "0" or not. At this time, if the signal of "AIS cell receiving" is "0", the source point transmits a signal of "protection switch start" to a sink point of the protected domain through the protection entity, thereby operating a protection switch. If the signal of "AIS cell receiving" is not "0", the source point transmits a signal of "protection switch stop" to a sink point of the protected domain through the protection entity, thereby stopping the protection switch. Then, a stored end-to-end AIS cell is transmitted to the next downstream side node. Accordingly, the ATM protection triggering method solves a CRC-10 calculation problem and a backward compatibility.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An asynchronous transfer mode (ATM) protection triggering method using a received alarm indication signal (AIS) flag for determining a failure generation location in an ATM network wherein protected domains are sequentially set or nested, said ATM protection triggering method comprising the steps of:

(a) initializing as "0" the received-AIS flag at source points of each of a plurality of protected domains;

(b) detecting a failure at a first node, generating an end-to-end AIS cell at the first node and transmitting the end-to-end AIS cell to a second node downstream from the first node;

(c) performing a received-AIS flag processing at the source point of one of the plural protected domains in which the first node is located;

(d) performing an end-to-end AIS cell processing at a sink point of one of the plural protected domains in which the second node is located and sending an AIS cell receiving report to the source point performing the received-AIS flag processing; and (e) operating a protection switch when the source point performing the received-AIS flag processing receives the AIS cell receiving report.

2. The method of claim 1, wherein said step (b) comprises the steps of:

(b-1) detecting an alarm signal generated from a failure link at the first node adjacent to the failure link;

(b-2) determining whether the first node adjacent to the failure link is the source point of the one of the plural protected domains;

(b-3) setting the received-AIS flag to "1" if the first node is determined to be the source point; and (b-4) periodically the end-to-end AIS cell to the downstream side node when the first node adjacent the failure link is determined not the source point.

3. The method of claim 1, wherein said step (c) comprises the steps of:

(c-1) passing the end-to-end AIS cell generated in step (b) through a third node of the one of the plural protected domains in which the first node in step (b) is located, the third node being downstream of the first node;

(c-2) determining whether the third node is a source point and terminating an operation if the third node determined not to be a source point; and (c-3) setting the received-AIS flag to "1" if the third node if determined the source point.

4. The method of claim 1, wherein said step (d) comprises the steps of:

(d-1) receiving the end-to-end AIS cell at the second node;

(d-2) determining whether the second node is a sink point and terminating the operation of the second node is determined not be a sink point;

(d-3) storing the end-to-end AIS cell if the second node is determined to be a sink point;

(d-4) transmitting an AIS cell receiving signal to the source point via a protection entity.

5. The method of claim 1, wherein said step (e) comprises the steps of:

(e-1) transmitting an AIS cell receiving signal from the sink point of one of the plural protected domains to the source point;

(e-2) determining whether the received-AIS flag of the source point is "0";

(e-3) transmitting a protection switch start signal through a protection entity if the received-AIS flag is determined to be "0";

(e-4) receiving the protection switch start signal at the sink point and initiating a protection switch operation;

(e-5) transmitting a protection switch stop signal to the sink point through the protection entity if the received-AIS flag is determined not to be "0"; and (e-6) receiving the protection switch stop signal at the sink point and transmitting the stored end-to-end AIS cell to a downstream node.

* * * * *